(12) United States Patent
Naukkarinen et al.

(10) Patent No.: US 10,961,140 B2
(45) Date of Patent: Mar. 30, 2021

(54) BIOREACTOR WITH MOVING CARRIERS

(71) Applicant: CLEWER AQUACULTURE OY, Turku (FI)

(72) Inventors: Martti Naukkarinen, Saaskjarvi (FI); Pasi Korvonen, Turku (FI)

(73) Assignee: CLEWER AQUACULTURE OY, Turku (FI)

( * ) Notice: Subject to any disclaimer, the term of this patent is extended or adjusted under 35 U.S.C. 154(b) by 0 days.

(21) Appl. No.: 16/606,824

(22) PCT Filed: Apr. 10, 2018

(86) PCT No.: PCT/FI2018/050256
§ 371 (c)(1),
(2) Date: Oct. 21, 2019

(87) PCT Pub. No.: WO2018/197744
PCT Pub. Date: Nov. 1, 2018

(65) Prior Publication Data
US 2020/0048120 A1   Feb. 13, 2020

(30) Foreign Application Priority Data
Apr. 24, 2017  (FI) ........................... 20175367

(51) Int. Cl.
*C02F 3/08*  (2006.01)
*C02F 3/30*  (2006.01)
(Continued)

(52) U.S. Cl.
CPC .............. *C02F 3/08* (2013.01); *C02F 3/1278* (2013.01); *C02F 3/305* (2013.01); *C02F 2103/20* (2013.01); *C02F 2203/006* (2013.01)

(58) Field of Classification Search
CPC .......... C02F 3/08; C02F 3/305; C02F 3/1278; C02F 3/302; C02F 3/303; C02F 3/10; C02F 2203/006; C02F 3/085; B01F 5/0659
(Continued)

(56) References Cited

U.S. PATENT DOCUMENTS 2,740,616 A   4/1956  Walden
4,705,634 A  11/1987  Reimann
(Continued)

FOREIGN PATENT DOCUMENTS

CN   201154929 Y   11/2008
CN   205 527 968 U   8/2016
(Continued)

OTHER PUBLICATIONS

International Search Report issued in International Application No. PCT/FI2018/050256 dated Jul. 10, 2018.
(Continued)

*Primary Examiner* — Nam X Nguyen
*Assistant Examiner* — Julia L. Wun
(74) *Attorney, Agent, or Firm* — Charles C. Achkar; Ostrolenk Faber LLP.

(57) ABSTRACT

The invention relates to a bioreactor having a tank with at least one bioreactor compartment containing a carrier medium, on the surface of which a biofilm may grow; wherein the first longitudinal end of the compartment comprises an inlet, and the second longitudinal end of the compartment comprises an outlet. The bioreactor comprises an aeration device for supplying reaction gas required for the purification process, and for agitating the carrier medium and the water to be purified into a rotary motion inside the compartment. A perforated pipe is arranged within the bioreactor compartment at a distance from the inner walls of
(Continued)

Figure 1:
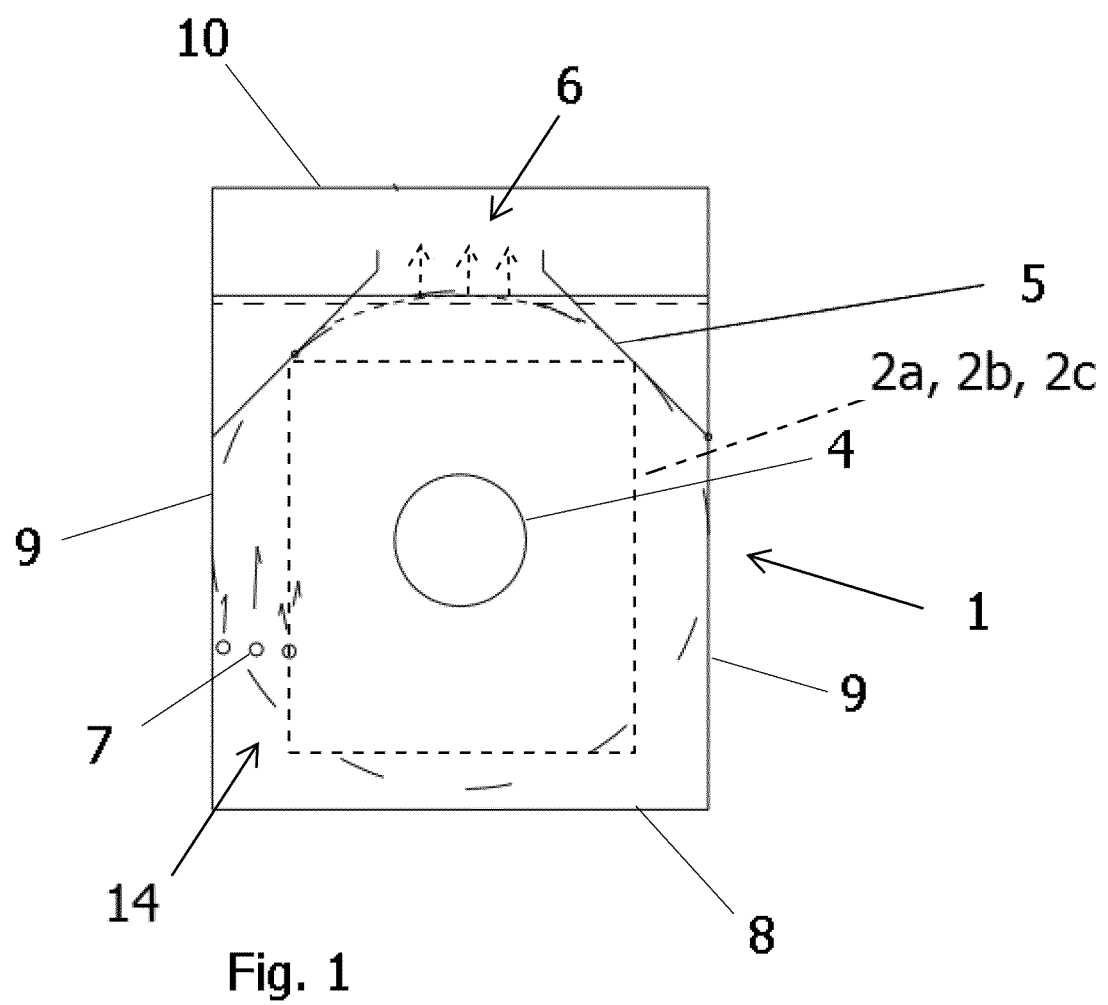

the compartment. Inside the perforated pipe is a closing. Guide plates are arranged outside the perforated pipe, which guide water to be purified into the bioreactor space outside the perforated pipe.

5 Claims, 4 Drawing Sheets

(51) Int. Cl.
*C02F 3/12* (2006.01)
*C02F 103/20* (2006.01)

(58) Field of Classification Search
USPC .................................................. 210/150, 616
See application file for complete search history.

(56) References Cited

U.S. PATENT DOCUMENTS

| | | | |
|---|---|---|---|
| 5,198,105 A | 3/1993 | Kauling et al. | |
| 5,458,779 A | 10/1995 | Odegaard | |
| 6,303,026 B1* | 10/2001 | Lindbo | C02F 3/301 |
| | | | 210/121 |
| 6,780,317 B1 | 8/2004 | Uotila et al. | |
| 9,522,832 B2* | 12/2016 | Furuya | C02F 3/305 |
| 2013/0015125 A1* | 1/2013 | Ingerle | C02F 3/1263 |
| | | | 210/609 |
| 2014/0027376 A1* | 1/2014 | Spiroff | C02F 3/28 |
| | | | 210/614 |

FOREIGN PATENT DOCUMENTS

| | | |
|---|---|---|
| EP | 0 931 767 A1 | 7/1999 |
| GB | 912 433 A | 12/1962 |
| JP | H10304789 A | 11/1998 |
| KR | 20080088108 A | 10/2008 |
| WO | WO 2007077298 A1 | 7/2007 |
| WO | WO 2013/064742 | 5/2013 |

OTHER PUBLICATIONS

Written Opinion of the International Searching Authority issued in International Application No. PCT/FI2018/050256 dated Jul. 10, 2018.

Finnish Searh Report issued in couterpart Finnish Application No. 20175367 dated Nov. 23, 2017.

Chilean Office Action issued in counterpart Chilean Application No. 201903042 dated Aug. 11, 2020.

* cited by examiner

BIOREACTOR WITH MOVING CARRIERS

CROSS REFERENCE TO RELATED APPLICATIONS

The present application is a § 371 National Stage application based on PCT/FI2018/050256 filed Apr. 10, 2018, which claims the benefit of Finland application No. 20175367 filed Apr. 24, 2017, the subject matter of each of which is incorporated by reference in their entirety.

The present invention relates to a bioreactor having a tank with at least one bioreactor compartment containing a carrier medium, on the surface of which a biofilm may grow, supply means for supplying the water to be purified into the bioreactor compartment from the first longitudinal end of the compartment, discharge means at the second opposite longitudinal end of the compartment for discharging the processed water from the compartment, means for supplying the reaction gas required for the purification process into the bioreactor compartment, and means for agitating the water to be purified into a rotary motion inside the compartment.

In biological purification of water, such as waste water, the water is passed through a reactor, wherein micro-organisms are utilised for converting the impurities in the water into harmless end-products, such as carbon dioxide, minerals and water. As a substrate for the micro-organisms are used, for example, pieces of carrier medium, on the surface of which the micro-organisms may grow as a biofilm. In biological water purification, the micro-organisms may also absorb non-biodegradable products, such as heavy metals, in themselves, that is, in the biomass. Purification may be carried our either aerobically or anaerobically.

The object of the present invention is to provide a bioreactor, which is suitable especially for treating recirculating water from fish farming by means of nitrification and denitrification. The aim is to remove ammonium and nitrogen compounds biologically from the water by means of suitable bacteria, in order to make the water a good living environment for the fish. The bacteria purifying the water form colonies on the surfaces of the carrier medium elements. The solution according to the invention is also applicable to other water purification processes, such as waste water purification.

In order to achieve the object of the invention, the bioreactor according to the invention is characterised in that in the bioreactor compartment, extending in its longitudinal direction, is arranged a perforated pipe, which is at a distance from the inner walls of the bioreactor compartment, and in the inlet end area of which are guide means for guiding the water to be purified into a bioreactor space outside the pipe, from which space the purified water enters into the perforated pipe and discharges from it through the outlet at the outlet end of the bioreactor compartment.

Preferred embodiments of the invention are described in the dependent claims.

The bioreactor according to the invention is comprised of a basin inside a tank and of carrier material consisting of pieces of carrier medium inside the basin, and of different parts, by means of which the passage of water is controlled and the pieces of carrier medium are kept in the basin so that they are not discharged with the flow. The operation also includes aeration, by means of which the pieces of carrier medium are brought into motion and oxygen is supplied to the process for the purpose of nitrification.

Figure 2:
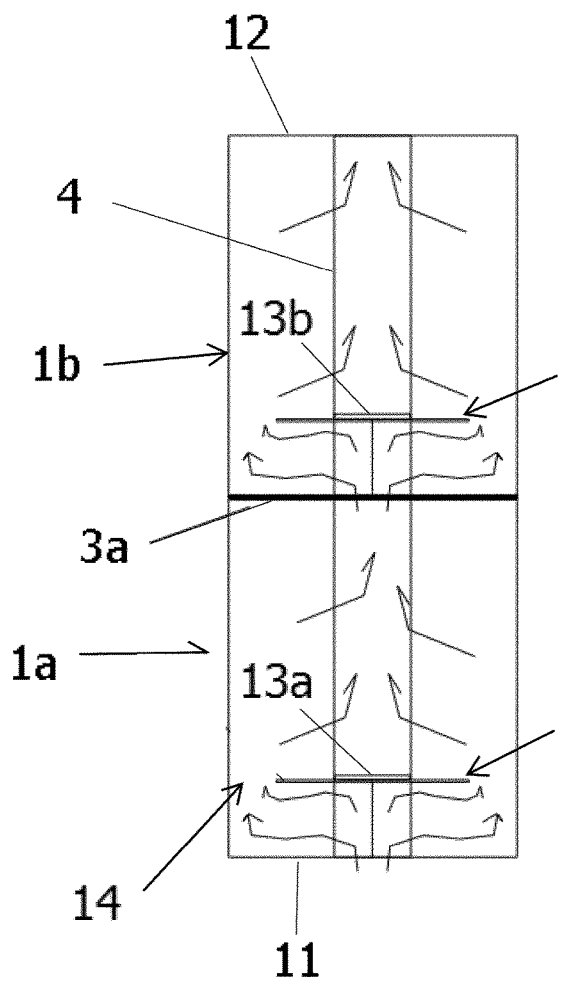
Figure 3:
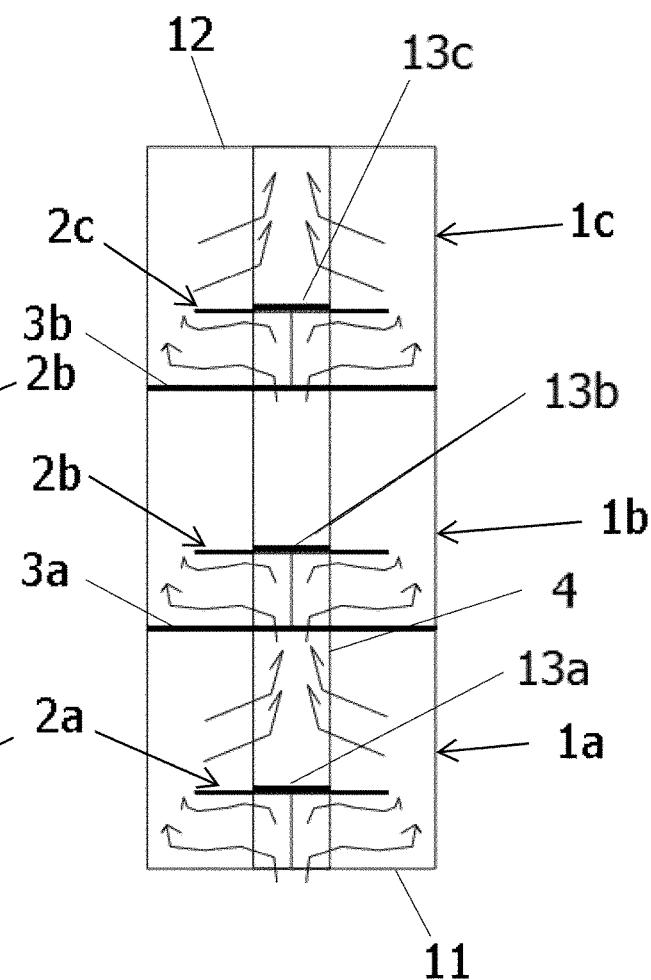
Figure 4:
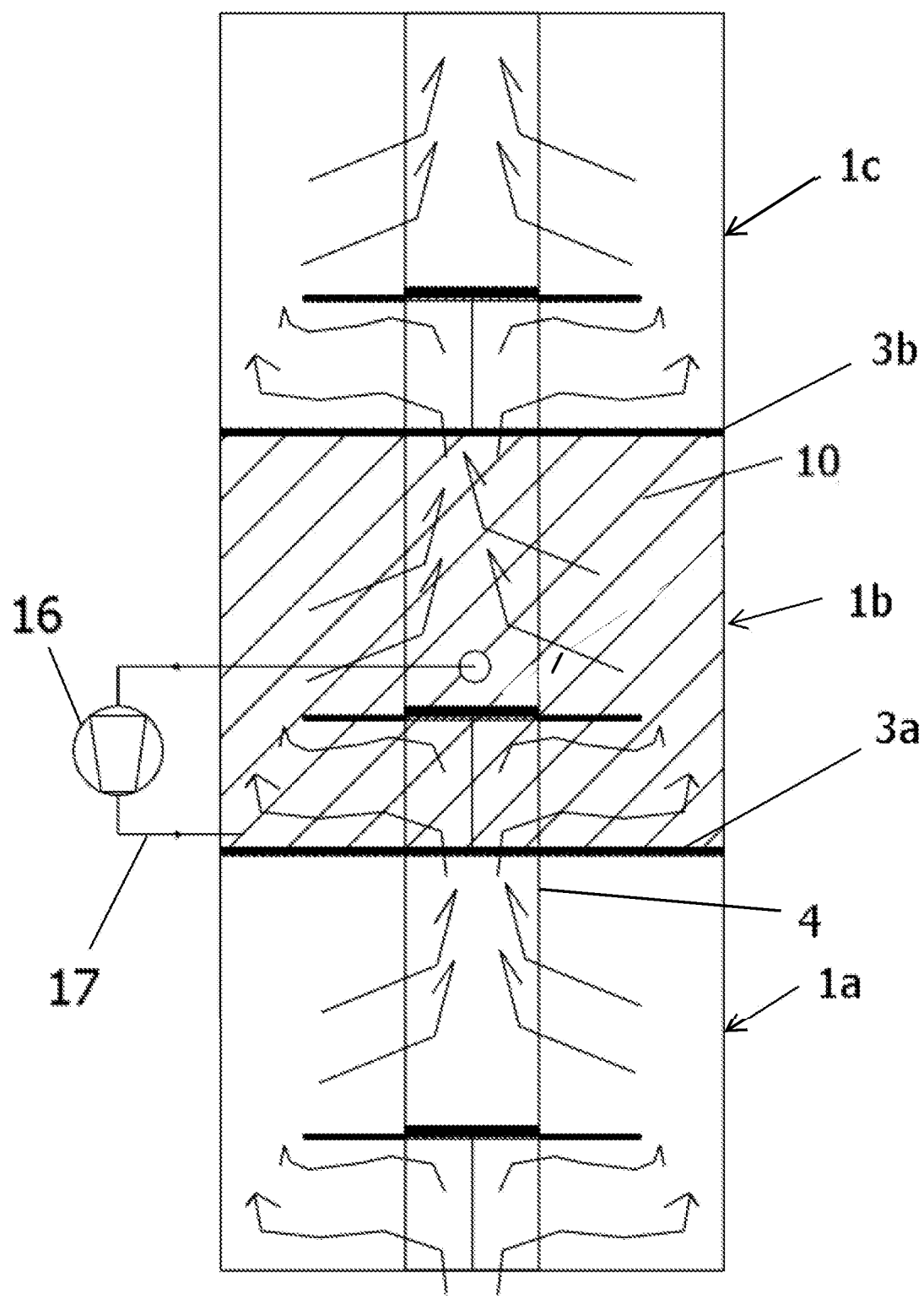
Figure 5:
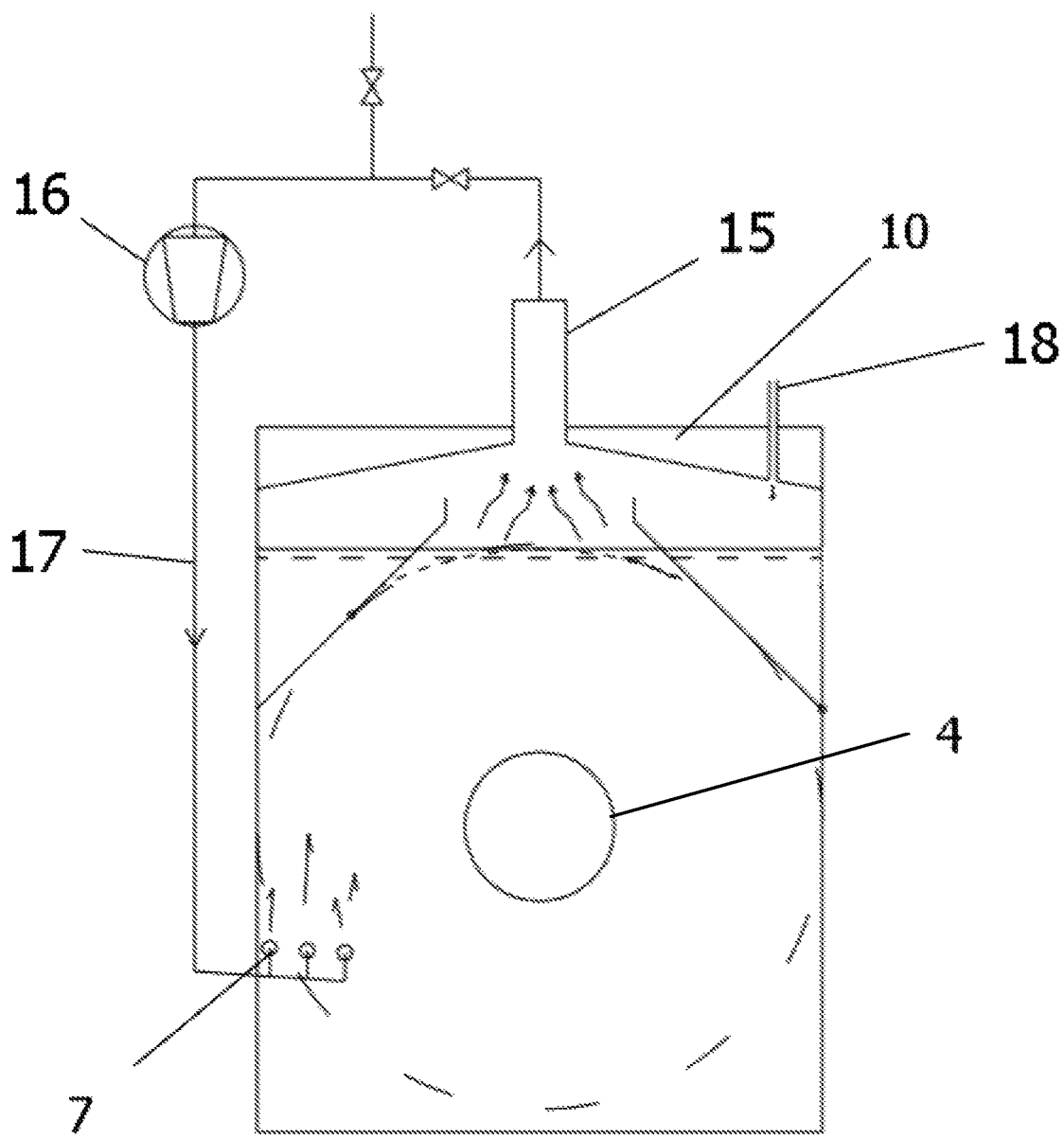

In the following, the invention is described in more detail with reference to the accompanying drawings, in which:

FIG. 1 shows a diagrammatic view in principle of a bioreactor according to the invention as seen from the end, FIG. 2 shows a diagrammatic top view in principle of an embodiment of the bioreactor according to the invention as a two-compartment implementation, FIG. 3 shows a diagrammatic top view in principle of an embodiment of the bioreactor according to the invention as a three-compartment implementation, FIG. 4 shows a diagrammatic view in principle of an example of the bioreactor according to the invention, wherein one compartment is provided for the denitrification process, and FIG. 5 shows a cross-sectional view of the compartment according to FIG. 4.

The embodiment shown in the figures includes a tank 1, which is rectangular in cross-section and has a bottom part 8, side walls 9 and end walls, which define a basin between them. The basin is preferably covered by a lid part 10. In the basin is formed at least one bioreactor compartment containing pieces of carrier medium (not shown), on which the biofilm may grow. In the upper part area of the bioreactor compartment are arranged guide plates 5 extending in the longitudinal direction of the tank (perpendicular to the plane of the paper), the guide plates extending diagonally inwards from the side walls 9 and upwards towards the lid part 10. These guide plates 5 facilitate bringing the water inside the compartment into rotary motion while, for example, an airflow from the air pipes 7 acts as the driving force of the rotary motion. In the upper part of the tank is an air space 6, into which the gases in the water can rise and from which they can be discharged, for example, through discharge openings (not shown) provided in the lid part 10.

Through the basin is mounted a pipe 4 such that its front end and back end are open at the basin wall or outside the basin. The pipe 4 is perforated either partly or completely. At the front end, where the water to be purified discharges from the pipe, the perforation covers at least 50% of the circumferential area of the pipe. The perforation is dimensioned such that the pieces of carrier medium cannot be transferred inside the pipe. At this point, blocking is allowed in order to distribute the flow of water more evenly in the basin. The diameter of the pipe is selected according to different purposes. Inside the pipe 4 may be another pipe with an intact surface (not shown) for guiding the flows. Inside the pipe 4 is arranged a closing disc 13a-13c at a point, in front of which the water is intended to pass, in the direction of flow, from the inside of the pipe to outside the pipe through the perforations. The aim is to cause the water to be processed to flow as evenly as possible through the entire mass of carrier medium, whereby the capacity of the biological activity can be optimally utilised. At the closing disc 13a-13c outside the pipe 4 is an dividing wall type guide plate 2a-2c, which forces the water to flow through a flow opening 14 remaining between the outermost edges of the guide plate 2a-2c, as seen in the cross-section of the reactor, and the sides 8, 9 of the tank, which promotes the utilisation of all of the carrier medium.

FIGS. 2 and 3 show a two-compartment, and correspondingly a three-compartment, bioreactor, wherein the basin is divided by dividing walls 3a, 3b, through which the pipe 4 extends, into parts so that identical reactor compartments follow in succession as desired and in the number desired. The perforated pipe 4 preferably extends over the entire length of the tank, located between the end walls 11 and 12 of the tank 1. Between the closing disc 13a inside the pipe 4 and the first dividing wall 3a, the water flows back inside the pipe 4 through the perforations in the pipe and continues further to the other side of the wall 3a, where the same manner of flow is repeated as the guide plate 2b guides the flow of water around the pipe 4. The same is repeated after the next wall 3b in the embodiment shown in FIG. 3, where there are three bioreactor compartments. The closing disc 13a-13c may also have an opening or it may be turned so that a part or all of the flow will pass the reactor compartment.

The aim is to fill the basin as full as possible with pieces of carrier medium to increase the output of the basal area. The pieces of carrier medium form a bed, which is rotated by aeration so that the bed circulates around the perforated pipe 4 or the water is otherwise mixed well. The aeration pipes 7 are positioned at a maximum depth of 1.5 metres from the surface of the water and air is blown so that the desired movement of the carrier medium bed is achieved. Blowing at an excessive depth may cause harmful oversaturation of nitrogen gas. Rotation may be facilitated, for example, by means of guide plates 5 placed at a 45 degree angle and positioned in the direction of flow such that the imagined circle of rotation is passed in the upper part of the bed, or in another manner improving the operation. The air pipes 7 are positioned on the side of the basin, close to the outer wall 9, so that the air flowing from them lifts the carrier medium bed upwards on one side of the bed if the aim is to rotate the carrier medium bed. When the nitrification (or denitrification) process is used in recirculating fish farms, the water is aerated in order to be able to blow carbon dioxide away from the water. In this sense, using air does not increase the necessary costs. By allowing most of the flow to pass any one of the compartments, and using this intermittently or continuously as denitrification, the water processed in this way can then be again led through the next compartment to nitrification, thus avoiding any sudden disadvantages caused by a reversing reactor.

Various operators use open-basin bioreactors, and conventional bioreactors, for example, moving bed reactors, are often only on approximately 80 cm thick carrier medium beds. The solutions of the present method thus bring about a considerable increase in capacity to these bioreactors.

The present method could easily be applied to the basins of the shallower tanks used for a long time, for example, in Denmark and Central Europe, thus immediately increasing their capacity. The solution according to the invention is particularly well suited for renovation sites. As regards construction costs, the solution according to the invention is economical and installation, for example, in open basins is quick. In the case of a fault condition, open basins have an advantage over closed basins because a possible fault can be located more easily in an open basin. It is usually advisable to cover the basin to prevent the growth of unwanted algae and bacteria due to the effect of sunlight.

The perforated pipe used in the solution according to the invention is preferably of steel.

At the denitrification stage, the water to be purified can be mixed and rotated by both air and possibly nitrogen.

FIGS. 4 and 5 show an example of an implementation for starting the denitrification process more rapidly. In this example implementation, the centremost compartment 1b of a three-compartment bioreactor is closed with a lid 10, in which has been made a gas discharge opening 15 for discharging the gases rising from the water to be purified. The discharge opening 15 is connected to a fan 16, which supplies reaction gas through the pipe 17 and through aeration pipes 7 into the bioreactor compartment. Air is typically supplied into a bioreactor as reaction gas to be used in an aerobic process. In an anaerobic denitrification process, where nitrogen in the form of a nitrate is reduced to nitrogen gas ($NO_3^- \rightarrow NO_2^- \rightarrow NO \rightarrow N_2O \rightarrow N_2$), the air can be circulated by means of a fan 16 in closed circulation, whereby the oxygen in the air dissolves from the air bubbles into the water to be purified and the bacteria on the surface of the pieces of carrier medium use up such oxygen dissolved in water. Thus, recirculated air gradually becomes oxygen-free, containing mainly nitrogen gas, more of which is produced during the denitrification process. By means of this recirculated gas consisting essentially of nitrogen gas, the carrier medium can be kept in constant motion. Instead of recirculated reaction gas can also be used other oxygen-free gases to keep the carrier medium in motion. Keeping the carrier medium bed in constant motion causes the water to be processed to be distributed evenly over the carrier medium and thus improves the efficiency of processing and keeps the carrier medium clean. The lid 10 of the bioreactor compartment is equipped with a breather valve 18 to equalise the pressure outside and inside the bioreactor compartment. The water to be purified is led at a desired flow rate through the compartment used for denitrification either continuously or in batches. If necessary, air may be blown into the compartment intermittently to prevent the formation of hydrogen sulphide. The other compartments 1a and 1c may be either open or covered with lids.

The solution according to the invention can also be applied, for example, in connection with the bioreactor described in the patent EP1971555, wherein the bioreactor includes a tank section with a round or elliptical cross-section, and wherein the reactor has control means for operating the reaction-gas bearing fluid supply means such that a spinning motion of the carrier medium, the water and the reaction-gas bearing fluid is effected thereby around a rotation centreline passing essentially through the tank's cross-sectional centre.

LIST OF REFERENCE NUMERALS 1 tank
2a-2c flow guide plate
3a-3b dividing wall
4 perforated pipe
5 guide plate
6 upper part of tank
7 air pipes
8 bottom of tank
9 side wall of tank
10 lid of tank
11 first end of tank
12 second end of tank
13a-13c closing disc
14 flow opening
15 gas discharge opening
16 fan
17 reaction gas supply pipe
18 breather valve

The invention claimed is:

1. A bioreactor having a tank with at least one bioreactor compartment containing a carrier medium, on the surface of which a biofilm may grow, a supply means for supplying water to be purified into the bioreactor compartment from a first longitudinal inlet end of the bioreactor compartment, discharge means at a second opposite longitudinal outlet end of the bioreactor compartment for discharging processed water from the bioreactor compartment, an aeration means for supplying reaction gas required for a purification process into the bioreactor compartment and for agitating the carrier medium and water to be purified into a rotary motion inside the compartment, in the bioreactor compartment, extending in its longitudinal direction, being arranged a perforated pipe, which is at a distance from inner walls of the bioreactor compartment, wherein at a distance from the inlet end of the perforated pipe there is a closing disc inside the perforated pipe and a flow guide plate outside the perforated pipe, the flow guide plate extending from the outer surface of the perforated pipe by a distance forming a flow opening from the inner walls of the bioreactor compartment for guiding water to be purified into a bioreactor compartment space outside the perforated pipe, from which space the purified water is arranged to enter inside the perforated pipe through the openings in the perforated pipe and discharge from it through the outlet end of the bioreactor compartment; and wherein the tank is rectangular in cross-section and has a bottom, side walls and a lid, and in the upper part area of the tank being arranged guide plates extending in the longitudinal direction of the tank, wherein the guide plates extend diagonally inwards from the side walls and upwards towards the lid, and which guide plates facilitate bringing the carrier medium and water in the bioreactor compartment into a rotary motion.

2. A bioreactor according to claim 1, wherein at least two bioreactor compartments are arranged in the tank, wherein the bioreactor compartments are separated from each other by a dividing wall.

3. A bioreactor according to claim 1, wherein the closing disc is a valve, which, when necessary, guides water to be purified inside the perforated pipe, thus passing the bioreactor compartment.

4. A bioreactor according to claim 1, wherein the material of the perforated pipe is steel.

5. A bioreactor according to claim 1, wherein at least one bioreactor compartment is provided with a lid and means for circulating reaction gas as closed circulation in order to bring about a denitrification process in the compartment.

* * * * *